United States Patent
Tsugawa et al.

(10) Patent No.: US 10,656,568 B1
(45) Date of Patent: May 19, 2020

(54) INTERMEDIATE TRANSFER MEMBER AND IMAGE FORMING APPARATUS

(71) Applicant: Konica Minolta, Inc., Tokyo (JP)

(72) Inventors: Shiori Tsugawa, Hino (JP); Sadaaki Sakamoto, Hachioji (JP); Shinichi Hamaguchi, Hino (JP); Ito Koga, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/598,725

(22) Filed: Oct. 10, 2019

(30) Foreign Application Priority Data

Nov. 21, 2018 (JP) .................................. 2018-218023

(51) Int. Cl.
*G03G 15/01* (2006.01)
*G03G 15/16* (2006.01)
*B82Y 30/00* (2011.01)

(52) U.S. Cl.
CPC ............ *G03G 15/162* (2013.01); *B82Y 30/00* (2013.01); *G03G 2215/0122* (2013.01); *G03G 2215/1623* (2013.01)

(58) Field of Classification Search
CPC ......... G03G 15/162; G03G 2215/1623; G03G 2215/0122; B82Y 30/00
See application file for complete search history.

(56) References Cited

U.S. PATENT DOCUMENTS 10,437,168 B2 * 10/2019 Koga ..................... G03G 15/08
2012/0244464 A1 * 9/2012 Wu ......................... B82Y 30/00
430/86

FOREIGN PATENT DOCUMENTS

| JP | H08-152759 A | 6/1996 |
| JP | 2000231289 A | 8/2000 |
| JP | 2003246927 A | 9/2003 |

* cited by examiner

Primary Examiner — Hoang X Ngo
(74) Attorney, Agent, or Firm — Lucas & Mercanti, LLP

(57) ABSTRACT

An intermediate transfer member that is used for electrophotographic image formation, includes carbon nanotubes and ferroelectric fillers in a base material layer containing a resin material as a principal component.

12 Claims, 6 Drawing Sheets

| INTERMEDIATE TRANSFER BELT | $\varepsilon 1, d1$ |
| --- | --- |
| TONER | $\varepsilon 2, d2$ |
| PAPER SHEET | $\varepsilon 3, d3$ |
| SECONDARY TRANSFER BELT | $\varepsilon 4, d4$ |

FIG. 1
| INTERMEDIATE TRANSFER BELT | $\varepsilon 1$, d1 |
|---|---|
| TONER | $\varepsilon 2$, d2 |
| PAPER SHEET | $\varepsilon 3$, d3 |
| SECONDARY TRANSFER BELT | $\varepsilon 4$, d4 |
FIG. 2A
FERROELECTRIC FILLERS + CARBON BLACK
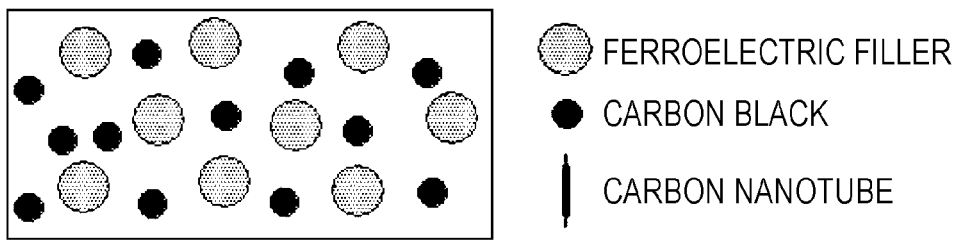
● FERROELECTRIC FILLER
● CARBON BLACK
| CARBON NANOTUBE
FIG. 2B
FERROELECTRIC FILLERS + CARBON NANOTUBES
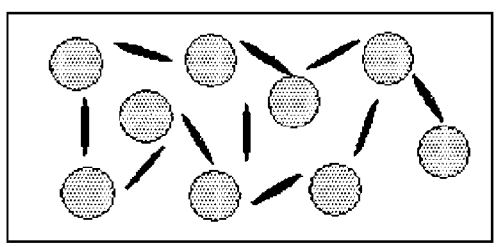
FIG. 2C
FERROELECTRIC FILLERS + CARBON NANOTUBES (ORIENTED)
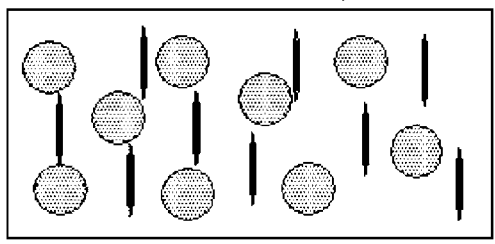

FIG. 6A

| | ELEMENT | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| PREPARATION CONDITIONS | FERROELECTRIC FILLER SEED | BARIUM TITANATE | BARIUM TITANATE | BARIUM TITANATE | BARIUM TITANATE | STRONTIUM TITANATE | BARIUM TITANATE | BARIUM TITANATE |
| | CONDUCTIVE FILLER SEED | CNT | CNT | CNT | CNT | CNT | CNT | CNT |
| | FERROELECTRIC FILLER CONTENT | 20% | 30% | 10% | 25% | 20% | 20% | 20% |
| | TOTAL FILLER CONTENT | 24% | 32% | 12% | 29% | 24% | 24% | 24% |
| | CNT DIAMETER | 40nm | 40nm | 40nm | 40nm | 40nm | 30nm | 150nm |
| | CNT LENGTH | 10μm | 10μm | 10μm | 10μm | 10μm | 5μm | 12μm |
| | THICKNESS | 80μm | 50μm | 100μm | 50μm | 80μm | 80μm | 80μm |
| EVALUATION RESULTS | RELATIVE PERMITTIVITY | 40 | 60 | 30 | 50 | 40 | 30 | 30 |
| | TENSILE ELONGATION AT BREAK | 30% | 20% | 100% | 25% | 30% | 20% | 20% |
| | TRANSFERABILITY RANK | RANK 5 | RANK 4 | RANK 4 | RANK 5 | RANK 5 | RANK 4 | RANK 4 |
| | DURABILITY | ◎ | ○ | ◎ | ○ | ◎ | ○ | ○ |
| REMARKS | | TRANSFERABILITY AND DURABILITY ARE BOTH EXCELLENT. | SINCE FILLER CONTENT IS LARGE (UPPER LIMIT), TENSILE ELONGATION AT BREAK IS LOW (LOWER LIMIT), AND DURABILITY IS GOOD. RELATIVE PERMITTIVITY IS HIGH (UPPER LIMIT), AND TRANSFERABILITY IS QUITE GOOD (RANK 4). | SINCE FILLER CONTENT IS SMALL (LOWER LIMIT), TENSILE ELONGATION AT BREAK IS HIGH (UPPER LIMIT), DURABILITY IS EXCELLENT. RELATIVE PERMITTIVITY IS LOW (LOWER LIMIT), BUT TRANSFERABILITY IS QUITE GOOD (RANK 4). | SINCE FILLER CONTENT IS LARGER THAN THAT IN EXAMPLE 1, AND TENSILE ELONGATION AT BREAK IS LOW, DURABILITY IS GOOD. RELATIVE PERMITTIVITY IS WITHIN PREFERABLE RANGE, AND TRANSFERABILITY IS EXCELLENT. | FERROELECTRIC FILLER SEED DIFFERS FROM THAT OF EXAMPLE 1. | SINCE CNT DIAMETER IS THE LOWER LIMIT DIAMETER, ELONGATION AT BREAK IS LOWER THAN THAT IN EXAMPLE 1, AND DURABILITY IS GOOD. ASPECT RATIO IS LOW, AND RELATIVE PERMITTIVITY IS LOW (LOWER LIMIT), BUT TRANSFERABILITY IS QUITE GOOD (RANK 4). | SINCE CNT DIAMETER IS THE UPPER LIMIT DIAMETER, ELONGATION AT BLEAK IS LOWER THAN THAT IN EXAMPLE 1, AND DURABILITY IS GOOD. ASPECT RATIO IS LOW, AND RELATIVE PERMITTIVITY IS LOW (LOWER LIMIT), BUT TRANSFERABILITY IS QUITE GOOD (RANK 4). |

FIG. 6B

| | ELEMENT | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| PREPARATION CONDITIONS | FERROELECTRIC FILLER SEED | BARIUM TITANATE | - | BARIUM TITANATE | - |
| | CONDUCTIVE FILLER SEED | CB | CNT | CB | CNT |
| | FERROELECTRIC FILLER CONTENT | 50% | 0% (TITANIUM OXIDE 30%) | 30% | 0% |
| | TOTAL FILLER CONTENT | 65% | 35% | 45% | 5% |
| | CNT DIAMETER | - | 40nm | - | 40nm |
| | CNT LENGTH | - | 10μm | - | 10μm |
| | THICKNESS | 50μm | 50μm | 50μm | 50μm |
| EVALUATION RESULTS | RELATIVE PERMITTIVITY | 30 | 20 | 15 | 7 |
| | TENSILE ELONGATION AT BREAK | 2% | 10% | 5% | 50% |
| | TRANSFERABILITY RANK | RANK 4 | RANK 3 | RANK 2 | RANK 1 |
| | DURABILITY | X | △ | X | ◎ |
| REMARKS | | CNT OF EXAMPLES IS NOT CONTAINED. WHERE CNT IS NOT CONTAINED, MANY FERROELECTRIC FILLERS NEED TO BE CONTAINED, TO ACHIEVE DESIRED RELATIVE PERMITTIVITY. THEREFORE, DURABILITY IS POOR. | FERROELECTRIC FILLERS OF EXAMPLES ARE NOT CONTAINED. SINCE FERROMAGNETIC FILLERS ARE NOT CONTAINED, RELATIVE PERMITTIVITY IS LOW, AND TRANSFERABILITY IS POOR. | CNT OF EXAMPLES IS NOT CONTAINED. BECAUSE OF COMBINATION OF CB AND FERROELECTRIC FILLERS, RELATIVE PERMITTIVITY IS LOW, AND TRANSFERABILITY IS POOR. TO ACHIEVE DESIRED RELATIVE PERMITTIVITY, TOTAL FILLER CONTENT BECOMES LARGER, RESULTING IN POOR DURABILITY. | FERROELECTRIC FILLERS OF EXAMPLES ARE NOT CONTAINED. SINCE FERROELECTRIC FILLERS ARE NOT CONTAINED, RELATIVE PERMITTIVITY IS LOW, AND TRANSFERABILITY IS POOR. |

INTERMEDIATE TRANSFER MEMBER AND IMAGE FORMING APPARATUS

The entire disclosure of Japanese patent Application No. 2018-218023, filed on Nov. 21, 2018, is incorporated herein by reference in its entirety.

BACKGROUND

Technological Field

The present invention relates to an intermediate transfer member and an image forming apparatus, and more particularly, to an intermediate transfer member to be used for electrophotographic image formation and an image forming apparatus including the intermediate transfer member.

Description of the Related Art

In an image forming apparatus that forms an image by an electrophotographic image forming method, a direct transfer technique by which a toner image formed with toner on an image carrier such as a photosensitive drum is fixed directly onto a recording material such as a paper sheet is not adopted, but an intermediate transfer technique by which a toner image on an image carrier is temporarily transferred (primary transfer) onto an intermediate transfer member (an intermediate transfer belt), is transferred (secondary transfer) onto a recording material, and is then fixed, is often adopted to prolong the life of the apparatus.

To achieve high image quality in such an electrophotographic image forming process, it is necessary to increase the electric field strength acting on the toner by providing the intermediate transfer belt with conductivity and dielectric properties. Regarding the provision of conductivity, JP 2003-246927 A discloses a polyimide tubular member that is used for a transfer belt, an intermediate transfer belt, a transfer fixing belt, or a fixing belt of an electrophotographic apparatus. In this structure, 0.1 to 40 parts by weight of carbon nanotubes are contained with respect to 100 parts by weight of polyimide resin, and the volume resistance value is within the range of $1\times10^6$ to $1\times10^{13}$ Ω·cm, for example.

Regarding the provision of dielectric properties, JP 08-152759 A discloses an image forming apparatus that transfers an image formed on a first image carrier onto an intermediate transfer member and further transfers the image onto a second image carrier. In this image forming apparatus, the intermediate transfer member contains a ferroelectric material that has a relative permittivity of 5 or higher, and has been turned into particles with an average particle size of 0.1 to 100 μm. Further, J P 2000-231289 A discloses an image forming method for transferring a toner image from a toner image carrier onto a transfer material such as a paper sheet while carrying and conveying the transfer material on a transfer material carrier member. In this disclosure, the transfer material carrier member contains dielectric ceramic as a ferroelectric material scattered in resin, and a transfer bias is applied to the transfer material carrier member, to transfer the toner image.

As carbon nanotubes are used to provide conductivity as in JP 2003-246927 A, it is possible to create an intermediate transfer belt that has little resistance change due to the environments and can be easily controlled to have a desired resistance value. Further, as a ferroelectric material is used to provide dielectric properties as in JP 08-152759 A and JP 2000-231289 A, the permittivity can be increased, and an intermediate transfer belt capable of achieving a high transfer efficiency can be created without application of a high transfer voltage.

However, the speed of the electrophotographic image forming process has been increased recently, and a higher transfer voltage than before is now necessary. Particularly, with paper having grooves formed therein, such as non-smooth paper, there is a problem that sufficiently high image quality cannot be achieved with the above described conventional intermediate transfer belt. To counter this problem, a method for increasing the permittivity of the intermediate transfer belt by increasing the rate of content of a ferroelectric material can be conceived. However, as the rate of content of the ferroelectric material increases, the intermediate transfer belt becomes brittle, resulting in poorer durability.

SUMMARY

The present invention has been made in view of the above problems, and a principal objective thereof is to provide an intermediate transfer member capable of achieving high image quality, and an image forming apparatus.

To achieve the abovementioned object, according to an aspect of the present invention, there is provided an intermediate transfer member that is used for electrophotographic image formation, and the intermediate transfer member reflecting one aspect of the present invention comprises carbon nanotubes and ferroelectric fillers in a base material layer containing a resin material as a principal component.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 1 is a schematic diagram for explaining a four-layer model of an intermediate transfer belt, toner, a paper sheet, and a secondary transfer belt;

FIGS. 2A to 2C are schematic diagrams for comparing a case where ferroelectric fillers and carbon black are added to a resin material, with a case where ferroelectric fillers and carbon nanotubes are added to a resin material;

FIG. 6A is a table for explaining the conditions for preparation and the results of evaluation of intermediate transfer belts of Examples 1 to 7; and FIG. 6B is a table for explaining the conditions for preparation and the results of evaluation of intermediate transfer belts of Comparative Examples 1 to 4.

DETAILED DESCRIPTION OF EMBODIMENTS

Figure 3:
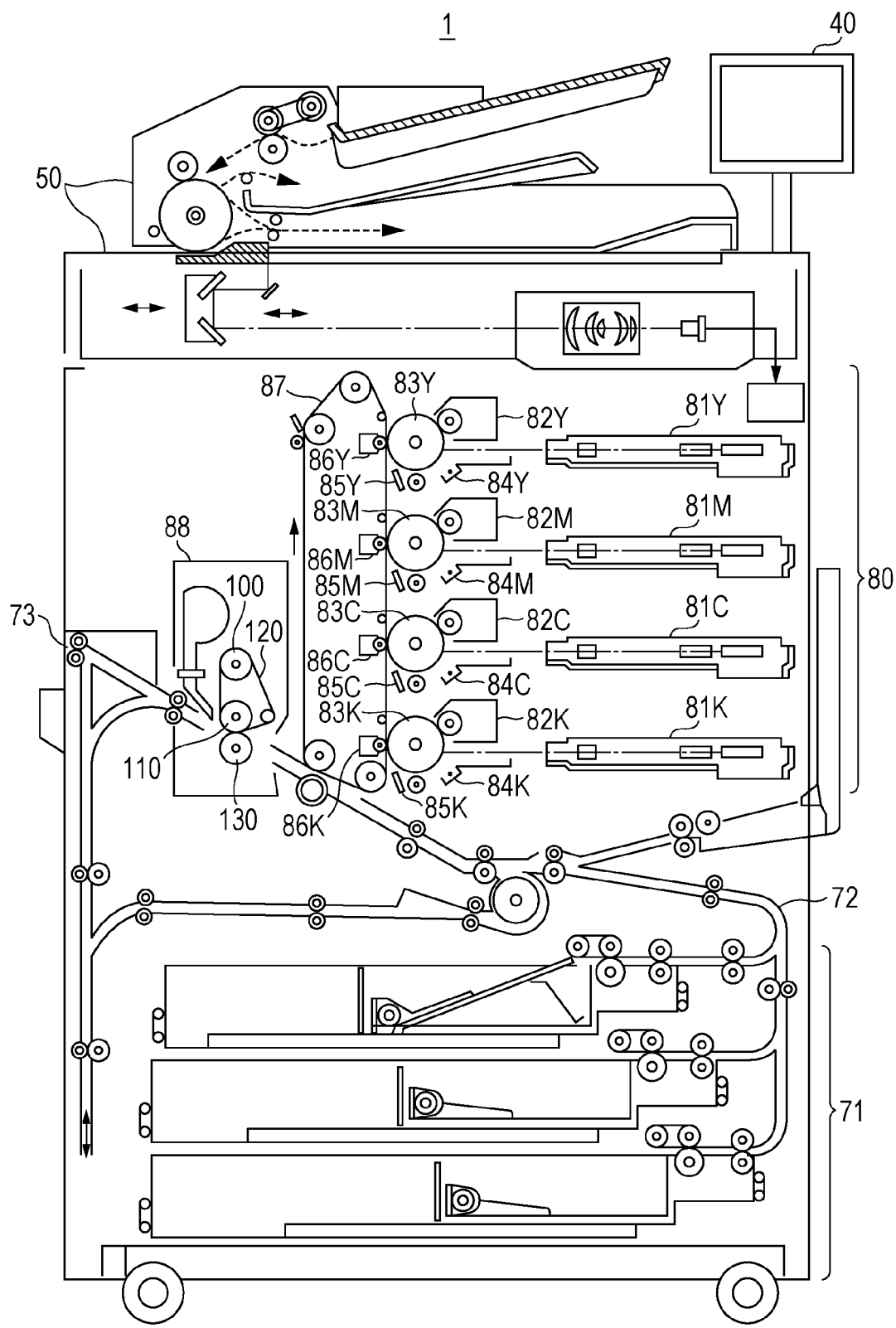
FIG. 3 is a diagram schematically showing the structure of an image forming apparatus according to an embodiment of the present invention.

Hereinafter, one or more embodiments of the present invention will be described with reference to the drawings. However, the scope of the invention is not limited to the disclosed embodiments.

As described in the Related Art, to achieve high image quality in an electrophotographic image forming process, it is necessary to increase the electric field strength acting on the toner by providing the intermediate transfer belt with conductivity and dielectric properties, and various materials have been suggested for that purpose. However, the speed of the recent electrophotographic image forming process has been increased, and a higher transfer voltage than before is now necessary. Particularly, with paper having grooves formed therein, such as non-smooth paper, there is a problem that sufficiently high image quality cannot be achieved with a conventional intermediate transfer belt.

To counter this problem, a method for increasing the permittivity of the intermediate transfer belt by increasing the rate of content of the ferroelectric material to be added to a resin material can be conceived. However, as the rate of content of the ferroelectric material increases, the intermediate transfer belt becomes brittle, resulting in poorer durability.

In view of the above, a four-layer model of an intermediate transfer belt, toner, a paper sheet, and a secondary transfer belt is considered, as shown in FIG. 1. Where ε1 represents the permittivity of the intermediate transfer belt, ε2 represents the permittivity of the toner layer, ε3 represents the permittivity of the paper sheet, d1 represents the thickness of the intermediate transfer belt, d2 represents the thickness of the toner layer, d3 represents the thickness of the paper sheet, and V represents the transfer voltage, the electric field E acting on the toner is expressed as $$E=(\varepsilon1\times\varepsilon3\times V)/(\varepsilon1\times\varepsilon3\times d2+\varepsilon2\times\varepsilon3\times d1+\varepsilon1\times\varepsilon2\times d3).$$

According to the above equation, the permittivity ε1 of the intermediate transfer belt is increased, and the thickness d1 is reduced, so that the electric field strength E acting on the toner can be increased without any increase in the transfer voltage V, and the transfer efficiency can be improved while discharge is suppressed. However, if the rate of content of the ferroelectric material is raised to increase the permittivity of the intermediate transfer belt, the durability of the intermediate transfer belt drops, as described above. Further, if the intermediate transfer belt is made thicker to increase its durability, the electric field E becomes smaller, and the necessary voltage becomes higher. Therefore, the transfer efficiency does not become higher. In other words, it is difficult to achieve both improvement of the permittivity and improvement of the durability of an intermediate transfer belt.

In view of this, the inventor of the present invention pay attention to the conductive material to be added for providing an intermediate transfer member (hereinafter referred to as an intermediate transfer belt) with conductivity, and has developed a method of increasing the permittivity not by increasing the rate of content of a ferroelectric material but by using the conductive material. By this method, the rate of content of the ferroelectric material can be minimized, and both improvement of the permittivity and improvement of the durability can be achieved. As a result of repeated experiments using various conductive materials, it was found that carbon nanotubes are the most suitable as the conductive material that can achieve a sufficiently high permittivity even when the rate of content of the ferroelectric material is lowered.

This aspect is now described in detail, with reference to drawings. FIG. 2A shows a combination of a conventional ferroelectric material (ferroelectric fillers) and a conductive material (carbon black). FIGS. 2B and 2C show a combination of a ferroelectric material (ferroelectric fillers) and a conductive material (carbon nanotubes) according to an embodiment of the present invention.

As shown in FIG. 2A, in a combination of ferroelectric fillers and carbon black, the ferroelectric fillers do not bind to one another. To obtain a desired permittivity, it is necessary to add a large number of ferroelectric fillers, but doing so will lower the durability. On the other hand, in a combination of ferroelectric fillers and carbon nanotubes as shown in FIG. 2B, the carbon nanotubes bind the ferroelectric fillers to one another (that is, the carbon nanotubes contribute to improvement of the permittivity). Accordingly, a desired permittivity can be obtained without addition of a large number of ferroelectric fillers, and both improvement of the permittivity and improvement of the durability can be achieved. Particularly, in a case where the carbon nanotubes are oriented in the front-back direction of the intermediate transfer belt as shown in FIG. 2C, the ferroelectric fillers can be efficiently bound to one another. Accordingly, the rate of content of the ferroelectric fillers can be further lowered, and it is possible to achieve both further improvement of the permittivity and further improvement of the durability. In other words, as the carbon nanotubes bind the ferroelectric fillers to one another, the polarizing action of the ferroelectric fillers can be increased (to the same state as in a case where the rate of content of the ferroelectric fillers is increased), and thus, the permittivity can be improved. As a result, the rate of content of the ferroelectric fillers for obtaining a desired permittivity can be lowered, and the durability can be improved.

Note that a carbon nanotube (hereinafter abbreviated as CNT) is a defect-free single layer having a structure in which a graphite hexagonal mesh plane (a graphene sheet) is rolled into a cylindrical shape, or a multilayer tube-shaped substance in which defect-free single layers are stacked in a nested manner. Meanwhile, a ferroelectric material is a kind of a dielectric material, and is a substance in which electric dipoles are aligned even when there is no electric field outside, and the direction of the dipoles can change with an electric field.

In the description below, the structure of an intermediate transfer belt according to an embodiment of the present invention, and an example of a method of manufacturing the intermediate transfer belt are explained.

An intermediate transfer belt according to an embodiment of the present invention contains conductive fillers and ferroelectric fillers in a base material layer containing a resin material as a principal component (in other words, the conductive fillers and the ferroelectric fillers are dispersed in the resin material). Various materials can be used as the resin material, but it is possible to use a super engineering plastic with strength and durability, such as polyimide (PI), polyamideimide (PAI), polyphenylene sulfide (PPS), or polyetheretherketone (PEEK). Note that containing a resin material as a principal component means containing the resin material at such a ratio that can satisfy the basic performance required for the intermediate transfer belt. The resin material may contain conductive fillers and ferroelectric fillers, and further contain various additives, a coating material, and the like.

The conductive fillers contained in the intermediate transfer belt according to an embodiment of the present invention are CNTs, and the diameter of the CNTs is preferably not smaller than 30 nm and not greater than 150 nm, and the length of the CNTs is preferably not smaller than 5 μm and not greater than 12 μm. As the diameter and the length of the CNTs are set within the above respective ranges, it is possible to provide the intermediate transfer belt with appropriate conductivity, and efficiently bind the ferroelectric fillers to one another.

A functional group may be covalently bound to the CNTs as necessary. For example, CNTs are treated with strong acid, to generate oxidized CNTs having carboxylic acid introduced into the surfaces. After being made to react with thionyl chloride, the oxidized CNTs are made to react with alkyl alcohol or the like, so that chemically decorated CNTs that dissolve in an organic solvent can be generated. Using such chemically decorated CNTs, it is possible to disperse CNTs uniformly in the resin material. Further, with the CNTs being dispersed in the resin material, an electric field from the outside is applied thereto. Thus, the CNTs can be oriented in a desired direction, and the permittivity of the intermediate transfer belt can be improved.

Meanwhile, the ferroelectric fillers contained in the intermediate transfer belt according to an embodiment of the present invention preferably include barium titanate, strontium titanate, and/or calcium titanate. As these ferroelectric fillers are combined with the CNTs, the permittivity of the intermediate transfer belt can be improved.

The rate of content of the ferroelectric fillers relative to the resin material is preferably not lower than 10% by volume and not higher than 30% by volume (not less than 50 parts by mass and not more than 190 parts by mass, in terms of mass ratio), and the total rate of content of the CNTs and the ferroelectric fillers is preferably not lower than 12% by volume and not higher than 32% by volume. As the ferroelectric fillers are combined with the CNTs, a high permittivity can be obtained even if the rate of content of the ferroelectric fillers is about the same. Accordingly, the rate of content of the ferroelectric fillers can be made lower than that in conventional arts. As a result, the durability of the intermediate transfer belt can be improved.

Meanwhile, the relative permittivity (the ratio between permittivity $\varepsilon$ and vacuum permittivity $\varepsilon 0$) of the intermediate transfer belt according to an embodiment of the present invention is preferably not lower than 30 and not higher than 60 (or more preferably, not lower than 40 and not higher than 50) at a frequency of 1 MHz. As the permittivity becomes higher, the required transfer voltage becomes lower, and discharge is more effectively suppressed, to improve transfer efficiency. However, if the permittivity is too high, the adhesion between the toner and the intermediate transfer belt increases, and the transfer efficiency drops. Therefore, the relative permittivity of the intermediate transfer belt is preferably in the above range, and the rate of content of the ferroelectric fillers (or the total rate of content of the CNTs and the ferroelectric fillers) is set within the above range, so that the relative permittivity can be adjusted to an appropriate value.

Further, the thickness of the intermediate transfer belt according to an embodiment of the present invention is preferably 50 to 100 μm. The smaller the thickness, the lower the voltage required for transfer, and the more effectively discharge is suppressed. As a result, the transfer efficiency is improved. Therefore, the thickness is preferably not higher than 100 μm, and the strength of the intermediate transfer belt can be maintained with a thickness not smaller than 50 μm. Accordingly, the thickness of the intermediate transfer belt is preferably not smaller than 50 μm and not higher than 100 μm, and the rate of content of the ferroelectric fillers (or the total rate of content of the CNTs and the ferroelectric fillers) is set within the above mentioned range. Thus, the relative permittivity can be adjusted to an appropriate value, and the electric field strength acting on the toner can be adjusted to an appropriate value by the intermediate transfer belt having the above thickness.

Meanwhile, the tensile elongation at break of the intermediate transfer belt according to an embodiment of the present invention is preferably not lower than 20% and not higher than 100%. As the tensile elongation at break is not lower than 20%, the durability of the intermediate transfer belt is improved (or the intermediate transfer belt can be driven without breaking). As the tensile elongation at break is not higher than 100%, the intermediate transfer belt can be prevented from being fully stretched, and from becoming unable to be subjected to drive control. Therefore, the tensile elongation at break of the intermediate transfer belt is preferably not lower than 20% and not higher than 100%, and the rate of content of the ferroelectric fillers (or the total rate of content of the CNTs and the ferroelectric fillers) is set within the above range, so that the tensile elongation at break can be adjusted to an appropriate value.

Next, a method of manufacturing an intermediate transfer belt having the above described configuration is described. The manufacturing method described below is merely an example, and any other appropriate method for manufacturing an intermediate transfer belt having the above described configuration may be used.

First, 5% by volume of CNTs (Marubeni LB101) and 20% by volume of barium titanate "BT05" (Sakai Chemical Industry Co., Ltd.) were added to a resin material that is polyamide-imide varnish "HR-16NN" (manufactured by Toyobo Co., Ltd.), and these materials were mixed with a mixer. Thus, a base material layer forming coating solution was prepared. While a stainless steel cylindrical mold was rotated about a cylindrical shaft, the base material layer forming coating solution was ejected from a dispenser nozzle being moved in the axial direction. The base material layer forming coating solution was applied spirally onto the outer peripheral surface of the mold, to form a continuous coating film. Heating was then performed at 100° C. for one hour while the cylindrical mold was rotated, so that most of the solvent was volatilized. After that, heating was performed at 250° C. for one hour, to form an endless belt-like base material layer. The thickness of the base material layer formed by the above method was 65 μm. This base material layer was then processed, to produce an intermediate transfer belt in which CNTs and ferroelectric fillers were dispersed in the entire resin material.

An intermediate transfer belt may be formed only with the base material layer prepared by the above method, or an intermediate transfer belt may be formed by bonding a resin layer to the base material layer.

Next, an image forming apparatus including an intermediate transfer belt according to an embodiment of the present invention is described. An image forming apparatus according to an embodiment of the present invention is a tandem image forming apparatus in which photosensitive drums 83Y, 83M, 83C, and 83K as photoreceptors corresponding to the four colors of yellow (Y), magenta (M), cyan (C), and black (K) are arranged in series in the running direction of the intermediate transfer belt, as shown in FIG. 3, for example.

Figure 4A:
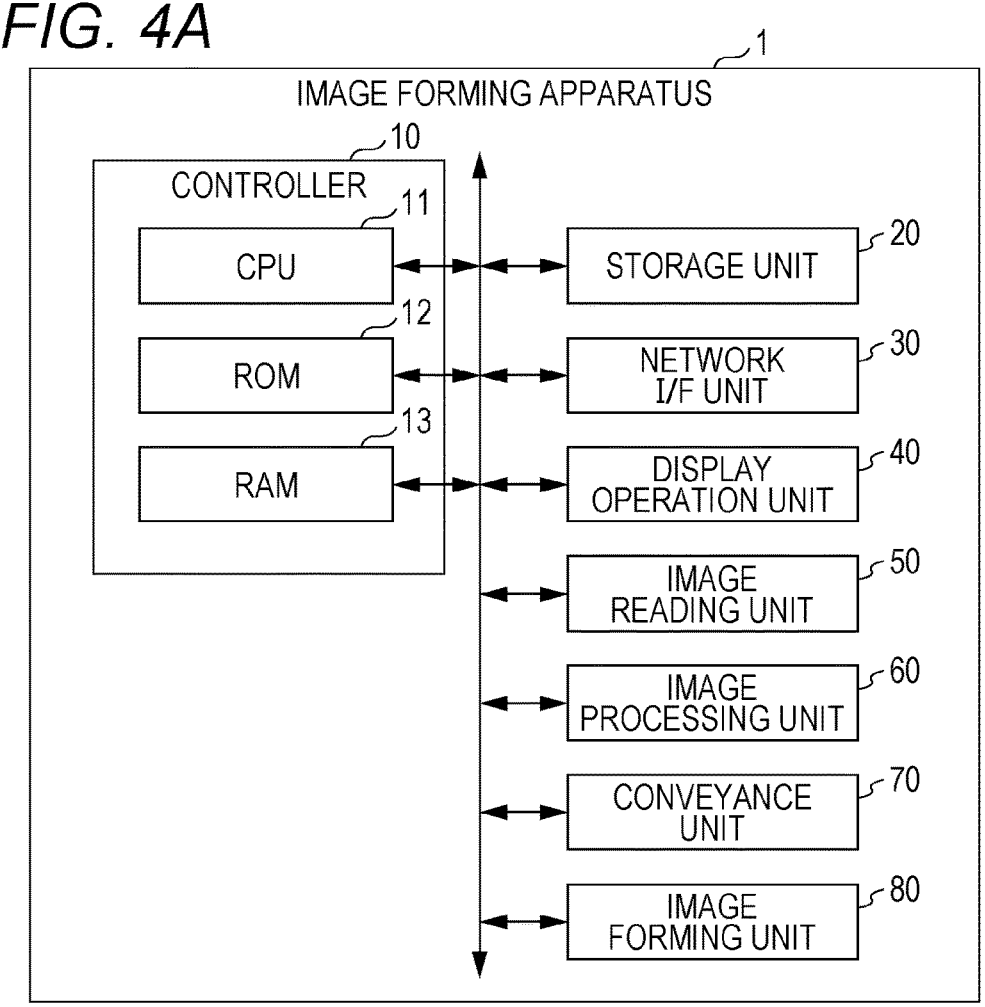
FIGS. 4A and 4B are block diagrams showing the configuration of an image forming apparatus according to an embodiment of the present invention.

As shown in FIG. 4A, an image forming apparatus 1 includes: a controller 10 including a central processing unit (CPU) 11 and memories such as a read only memory (ROM) 12 and a random access memory (RAM) 13; a storage unit 20 formed with a hard disk drive (HDD) or a solid state drive (SSD); a network interface (I/F) unit 30 formed with a network interface card (NIC) or a modem; a display operation unit 40 formed with a touch panel or the like; an image reading unit 50 formed with an auto document feeder (ADF) and a scanner or the like; an image processing unit 60 formed with a raster image processor (RIP) or the like; a conveyance unit 70; and an image former 80. An intermediate transfer belt according to this embodiment is included in the image former 80 that processes a paper sheet conveyed from the conveyance unit 70.

As shown in FIG. 3, the conveyance unit 70 includes a sheet feeder 71, a conveyance mechanism 72, and a sheet ejector 73. The paper sheets stored in the sheet feeder 71 are sent one by one from the uppermost portion, and are conveyed to the image former 80 by the conveyance mechanism 72 including a plurality of conveyance rollers such as registration rollers. At this stage, a registration unit provided with the registration rollers corrects tilting of a supplied paper sheet, and adjusts the conveyance timing. The paper sheet having an image formed thereon by the image former 80 is ejected onto a sheet catch tray outside the apparatus by the sheet ejector 73 including sheet ejection rollers.

Figure 4B:
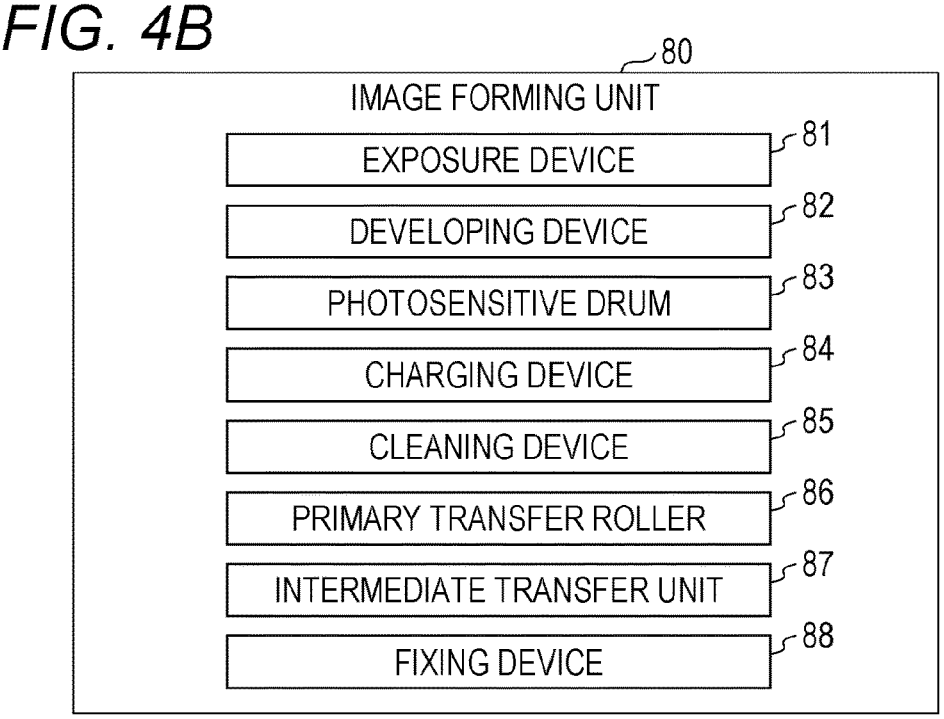

As shown in FIGS. 3 and 4B, the image former 80 includes: exposure devices 81 (81Y, 81M, 81C, and 81K), developing devices 82 (82Y, 82M, 82C, and 82K), photosensitive drums 83 (83Y, 83M, 83C, and 83K), charging devices 84 (84Y, 84M, 84C, and 84K), cleaning devices 85 (85Y, 85M, 85C, and 85K), primary transfer rollers 86 (86Y, 86M, 86C, and 86K), an intermediate transfer unit 87, and a fixing device 88, which are provided for the respective color components Y, M, C, and K. The respective components will be briefly described below. In the description below, symbols without Y, M, C, and K will be used where appropriate.

The photosensitive drums 83 of each of the color components Y, M, C, and K is an image carrier that has an organic photosensitive layer (OPC) formed on the outer peripheral surface of a cylindrical metal base made of an aluminum material. The organic photosensitive layer is provided with an overcoat layer as a protective layer. The photosensitive drum 83 that is in a grounded state and is being driven by the intermediate transfer belt is rotated in the counterclockwise direction in FIG. 3.

The charging device 84 of each of the color components Y, M, C, and K is of a scorotron type, and is disposed near the corresponding photosensitive drum 83, with its longitudinal direction being adjusted to the direction of the rotation axis of the photosensitive drum 83. The charging device 84 performs corona discharge of the same polarity as the toner, to apply a uniform potential to the surface of the photosensitive drum 83.

The exposure device 81 of each of the color components Y, M, C, and K performs scanning parallel to the rotation axis of the corresponding photosensitive drum 83 with a polygon mirror or the like, and performs image exposure based on image data on the surface of the uniformly-charged photosensitive drum 83, to form an electrostatic latent image.

The developing device 82 of each of the color components Y, M, C, and K contains a two-component developer formed with a small-particle toner of the corresponding color component and a magnetic material, and conveys the toner onto the surface of the photosensitive drum 83, to visualize the electrostatic latent image carried on the photosensitive drum 83 with the toner.

The primary transfer roller 86 of each of the color components Y, M, C, and K presses the intermediate transfer belt of this embodiment against the photosensitive drum 83, and sequentially superimposes the toner images in the respective colors formed on the corresponding photosensitive drums 83 onto the intermediate transfer belt through primary transfer.

The cleaning device 85 of each of the color components Y, M, C, and K collect residual toner remaining on the corresponding photosensitive drum 83 after the primary transfer. Further, a lubricant application mechanism (not shown) is disposed adjacent to the cleaning device 85 on the downstream side in the direction of rotation of the corresponding photosensitive drum 83, and applies a lubricant to the photosensitive surface of the photosensitive drum 83.

The intermediate transfer unit 87 includes an endless intermediate transfer belt 87a onto which an image is to be transferred, support rollers 87b, a secondary transfer roller 87c, and an intermediate transfer cleaning unit 87d, and the intermediate transfer belt 87a is stretched around a plurality of support rollers 87b. When the intermediate transfer belt 87a on which toner images in the respective colors have been transferred by the primary transfer rollers 86Y, 86M, 86C, and 86K through primary transfer is pressed against a paper sheet by the secondary transfer roller 87c, the toner images are transferred onto the paper sheet through secondary transfer by the electric field acting on the toner on the basis of the transfer voltage between the intermediate transfer belt 87a and the secondary transfer roller 87c, and are sent to the fixing device 88. The intermediate transfer cleaning unit 87d has a belt cleaning blade that slides on the surface of the intermediate transfer belt 87a. The transfer residual toner remaining on the surface of the intermediate transfer belt 87a after the secondary transfer is scraped off and removed by the belt cleaning blade.

The fixing device 88 includes a heating roller 88a serving as a heat source, a fixing roller 88b, a fixing belt 88c stretched between the heating roller 88a and the fixing roller 88b, and a pressure roller 88d. The pressure roller 88d is in pressure contact with the fixing roller 88b via the fixing belt 88c, and the pressure contact portion forms a nip portion. The fixing belt 88c heated by the heating roller 88a and the respective rollers heat and pressurize the paper sheet passing through the nip portion, to fix an unfixed toner image formed on the paper sheet.

The paper sheet on which the toner image has been fixed by the fixing device 88 is ejected onto the sheet catch tray outside the apparatus by the sheet ejector 73 having sheet ejection rollers.

In a case where image formation is performed with such an image forming apparatus 1, the intermediate transfer belt 87a of this embodiment has a relative permittivity of 30 to 60 (preferably 40 to 50) when the frequency is 1 MHz. Accordingly, the required transfer voltage can be made lower than that in a conventional case, and discharge can be suppressed so that an image can be transferred in a preferred manner. Further, as CNTs are added to the intermediate transfer belt 87a, the rate of content of the ferroelectric fillers necessary for achieving the above mentioned relative permittivity can be lowered. Thus, the durability of the intermediate transfer belt 87a can be made higher than that in a conventional case.

FIGS. 3, 4A, and 4B show an example of the image forming apparatus 1 according to an embodiment of the present invention, and the structure and the configuration thereof can be appropriately changed as long as the intermediate transfer belt 87a of this embodiment can be used therein.

EXAMPLES

To check the effects of an intermediate transfer belt according to the above described embodiment of the present invention, intermediate transfer belts in which the rate of content of CNTs and the rate of content of ferroelectric fillers were varied were prepared by the manufacturing method described in the embodiment (Examples 1 to 7). For comparison, intermediate transfer belts containing different conductive filler materials and ferroelectric filler materials were also prepared (Comparative Examples 1 to 4).

Specifically, in Examples 1 to 4, 6, and 7, CNTs were used as the conductive fillers, barium titanate was used as the ferroelectric fillers, and the rate of content of the ferroelectric fillers, the total rate of content of the CNTs and the ferroelectric fillers, the diameter of the CNTs, the length of the CNTs, and the film thickness were varied in the preparation of intermediate transfer belts. In the preparation of an intermediate transfer belt in Example 5, strontium titanate was used as the ferroelectric fillers, and the other conditions were the same as in Example 1.

In Comparative Examples 1 and 3, carbon black (CB) was used as the conductive fillers, barium titanate was used as the ferroelectric fillers, and the rate of content of the ferroelectric fillers, and the total rate of content of the CB and the ferroelectric fillers were varied in the preparation of intermediate transfer belts. In Comparative Example 2, CNTs were used as the conductive fillers, and titanium oxide was added, to prepare an intermediate transfer belt. In Comparative Example 4, CNTs were used as the conductive fillers, and no ferroelectric fillers were added, to prepare an intermediate transfer belt.

The intermediate transfer belts prepared under the conditions in Examples 1 to 7 and Comparative Examples 1 to 4 were subjected to permittivity measurement, measurement of tensile elongation at break, image evaluation, and durability evaluation. In the description below, specific methods for the respective evaluations are explained.

<Permittivity Measurement>

Figure 5:
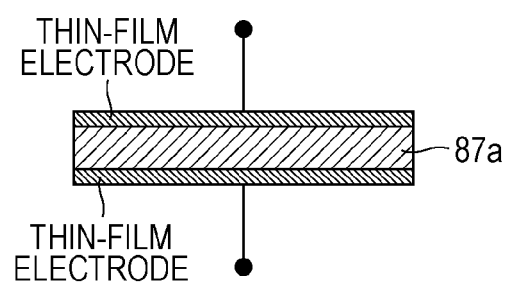
FIG. 5 is a schematic diagram for explaining a permittivity measurement method.

As shown in FIG. 5, thin-film electrodes with a resistance of one-digit Ω were formed on the surface of the intermediate transfer belt 87a by sputtering or the like, and were cut out with a mold of 10 mm φ, so that measurement samples were prepared. An impedance analyzer (manufactured by Solartron Analytical; Model 12608W) was used, to measure relative permittivities by an electrode contact method from 1 Hz to 1 MHz in an AC impedance measurement mode.

<Measurement of Tensile Elongation at Break>

On the basis of ISO527 and RS K7161, the intermediate transfer belts were processed to create dumbbell-shaped test pieces, and each test piece was pulled from both sides by an extensometer capable of measuring changes in the distance between marked lines with ISO9513 Class 1 accuracy. The elongation rate at the time when the intermediate transfer belt broke (the ratio of the extended length to the original length) was then measured.

<Image Evaluation>

Leather-like 203 g paper was used as uneven paper, and a predetermined image was formed on this leather-like 203 g paper with an image forming apparatus "bizhub PRESS C1100" (Konica Minolta). Toner transfer states at concave portions were then rated on a scale of one to five. Note that the evaluation environments were 20° C. in temperature and 50% in humidity, and the target level is rank 4 or higher.

Rank 5: Completely transferred.
Rank 4: Several points are missing at two-layer portions. There is no problem with the single-color portions.
Rank 3: Some two-layer portions are missing at random. There is no problem with the single-color portions.
Rank 2: Some single-color portions are missing at random.
Rank 1: The single-color portions are completely missing.

<Durability Evaluation>

With the image forming apparatus "bizhub PRESS C1100" (Konica Minolta), the damages states of the intermediate transfer belt when 1000K sheets were fed and when 2000K sheets were fed were compared in the following four levels. Note that the evaluation environments were 20° C. in temperature and 50% in humidity, and the target level is "○" or higher without any cracks.

⊚: No cracks after 2000K feed.
○: No cracks after 1000K feed.
Δ: Damage was observed at the edges after 1000K feed.
x: Damage was observed at the center portion as well as at the edges after 1000K feed.

FIGS. 6A and 6B are tables that summarize the conditions for preparation of the intermediate transfer belts of Examples 1 to 7 and Comparative Examples 1 to 4, and the results of evaluation regarding the above mentioned evaluation items. The tables are divided for convenience in plotting.

Examples 1 to 4, 6, and 7 in FIG. 6A are examples in which barium titanate was used as the ferroelectric fillers, and CNTs were used as the conductive fillers. The transferability rank in the image evaluation is 4 or higher, which is the target level, and the durability is evaluated as "○" or higher, which is also the target level. Accordingly, Examples 1 to 4, 6, and 7 are preferable as the conditions for preparation of an intermediate transfer belt. Specifically, it is apparent that the rate of content of the ferroelectric fillers in the resin material is preferably 10% to 30% by volume, the total rate of content of the ferroelectric fillers and the CNTs is preferably 12% to 32% by volume (the preferred range of the rate of content of the CNTs is 2% to 4% by volume), the CNT diameter is preferably 30 to 150 nm, the CNT length is preferably 5 to 12 μm, and the film thickness is preferably 50 to 100 μm. It is also apparent that the relative permittivity of the intermediate transfer belt is preferably 30 to 60 (particularly 40 to 50, which corresponds to rank 5 in transferability), and the tensile elongation at break is preferably 20% to 100%.

Further, as can be seen from the result of comparison between Example 1 and Example 5, in a case where strontium titanate was used as the ferroelectric filler seed, the transferability rank is 5, and the durability is "⊚". This shows that barium titanate or strontium titanate is preferable as the ferroelectric fillers. Although not shown in the table, the same results as above were obtained when calcium titanate was used as the ferroelectric fillers, and the other conditions were the same as in Example 1 in preparing an intermediate transfer belt. Accordingly, calcium titanate is also preferable as the ferroelectric fillers.

Further, as shown in Comparative Example 1 in FIG. 6B, in a case where carbon black is used as the conductive filler seed, the rate of content of the ferroelectric fillers needs to be increased to make the relative permittivity fall within the above range of 30 to 60. As the rate of content of the ferroelectric fillers increases (to 50% by volume in this example), the tensile elongation at break decreases (to 2% in this example), resulting in poorer durability. Further, as shown in Comparative Example 3, when the rate of content of the ferroelectric fillers is reduced (to 30% by volume in this example) to increase the tensile elongation at break, the relative permittivity decreases (to 15% in this example) and moves out of the range of 30 to 60 shown in Examples 1 to 7, resulting in a lower rank in transferability (dropping to rank 2 in this example). This proves that it is important to use CNTs as the conductive fillers.

Furthermore, as shown in Comparative Examples 2 and 4 in FIG. 6B, even in a case where CNTs are used as the conductive filler seed, if any ferroelectric fillers are not added, the relative permittivity decreases (to 20 in Comparative Example 2, and to 10 in Comparative Example 4), and moves out of the range of 30 to 60 shown in Examples 1 to 7. Therefore, the rank in transferability drops (to rank 3 in Comparative Example 2, and to rank 1 in Comparative Example 4). This shows that it is important to combine CNTs and ferroelectric fillers.

In accordance with the above results, CNTs are used as the conductive fillers, barium titanate, strontium titanate, and/or calcium titanate is used as the ferroelectric fillers, the CNTs are combined with these ferroelectric fillers, the rate of content of the ferroelectric fillers is 10% to 30% by volume, the total rate of content of the ferroelectric fillers and the CNTs is 12% to 32% by volume (the preferred range of the rate of content of the CNTs is 2% to 4% by volume), the CNT diameter is 30 to 150 nm, the CNT length is 5 to 12 μm, and the film thickness is 50 to 100 μm. The relative permittivity of an intermediate transfer belt prepared under such conditions is 30 to 60 (preferably 40 to 50), the tensile elongation at break is 20% to 100%, and the more preferable results of image evaluation and durability evaluation can be achieved.

The present invention is not limited to the above examples, and any appropriate modifications can be made to the configurations and the control thereof, without departing from the scope of the present invention.

For example, in the above embodiments and Examples, an endless intermediate transfer belt is used as an example of an intermediate transfer member. However, the present invention can also be applied to an intermediate transfer member of any appropriate mode in which a toner image formed on an image carrier such as a photosensitive drum is temporarily transferred (primary transfer) before being transferred onto an image support member such as a paper medium (secondary transfer).

Further, in the above embodiments and Examples, barium titanate, strontium titanate, and calcium titanate have been mentioned as examples of ferroelectric fillers. However, these materials may be used in combination with one another, or some other material that can be combined with CNTs to achieve a desired permittivity even if the rate of content thereof is low may be used.

In the above embodiments and Examples, CNTs are used as an example of the conductive fillers. However, it is also possible to use some other material that can provide conductivity, and bind the ferroelectric fillers to one another to increase the permittivity, like CNTs.

The present invention can be applied to an intermediate transfer member to be used for electrophotographic image formation, and an image forming apparatus including the intermediate transfer member.

With an intermediate transfer member and an image forming apparatus according to an embodiment of the present invention, high image quality can be achieved.

This is because the base material layer of the intermediate transfer member containing a resin material as its principal component contains carbon nanotubes and ferroelectric fillers (such as barium titanate, strontium titanate, or calcium titanate).

Although embodiments of the present invention have been described and illustrated in detail, the disclosed embodiments are made for purposes of illustration and example only and not limitation. The scope of the present invention should be interpreted by terms of the appended claims

What is claimed is:

1. An intermediate transfer member that is used for electrophotographic image formation, the intermediate transfer member comprising
   carbon nanotubes and ferroelectric fillers in a base material layer containing a resin material as a principal component.

2. The intermediate transfer member according to claim 1, wherein
   a rate of content of the ferroelectric fillers relative to the resin material is not lower than 10% by volume, and not higher than 30% by volume.

3. The intermediate transfer member according to claim 2, wherein
   a total rate of content of the carbon nanotubes and the ferroelectric fillers relative to the resin material is not lower than 12% by volume, and not higher than 32% by volume.

4. The intermediate transfer member according to claim 1, wherein
   a diameter of the carbon nanotubes is not smaller than 30 nm, and not larger than 150 nm.

5. The intermediate transfer member according to claim 1, wherein
   a length of the carbon nanotubes is not smaller than 5 μm, and not greater than 12 μm.

6. The intermediate transfer member according to claim 1, wherein
   a thickness of the intermediate transfer member is not smaller than 50 μm, and not greater than 100 μm.

7. The intermediate transfer member according to claim 1, wherein
   a relative permittivity of the intermediate transfer member at a frequency of 1 MHz is not lower than 30, and not higher than 60.

8. The intermediate transfer member according to claim 1, wherein
   a relative permittivity of the intermediate transfer member at a frequency of 1 MHz is not lower than 40, and not higher than 50.

9. The intermediate transfer member according to claim 1, wherein
   a tensile elongation at break of the intermediate transfer member is not lower than 20%, and not higher than 100%.

10. The intermediate transfer member according to claim 1, wherein
    the ferroelectric fillers include one of barium titanate, strontium titanate, and calcium titanate.

11. The intermediate transfer member according to claim 1, wherein
    the intermediate transfer member has a shape of an endless belt, and is formed with at least one layer including the base material layer.

12. An image forming apparatus that has a function of performing primary transfer to transfer a toner image carried on an electrostatic latent image carrier onto an intermediate transfer member, and performing secondary transfer to transfer the toner image from the intermediate transfer member onto a recording material, the image forming apparatus comprising the intermediate transfer member according to claim 1 as the intermediate transfer member.

* * * * *